FREIHERR MAX VON BECHTOLSHEIM.
COUNTING DEVICE.
APPLICATION FILED JAN. 4, 1910.

1,009,886.

Patented Nov. 28, 1911.

Witnesses:
R. L. Peterson
Clussa Franch

Inventor
Freiherr Max von Bechtolsheim
by
his Attorney

UNITED STATES PATENT OFFICE.

FREIHERR MAX VON BECHTOLSHEIM, OF MUNICH, GERMANY.

COUNTING DEVICE.

1,009,886.  Specification of Letters Patent.  Patented Nov. 28, 1911.

Application filed January 4, 1910. Serial No. 536,270.

*To all whom it may concern:*

Be it known that I, FREIHERR MAX VON BECHTOLSHEIM, citizen of Germany, residing at Munich, Bavaria, Germany, have invented certain new and useful Improvements in Counting Devices; and I do hereby declare the following to be a full, clear, and exact description of the invention, such as will enable others skilled in the art to which it appertains to make and use the same.

My invention relates to a calculating machine adapted to perform the operations of addition and subtraction and relates to that type of machine employing a plurality of superposed revoluble numeral disks.

The principal object of the invention is to provide an apparatus of this character which is simple in construction and owing to the fact that it contains as few parts as possible, it may be cheaply manufactured in large quantities.

In general terms, the invention comprehends a structure including a plurality of numeral disks in coöperative relation with a plurality of friction disks, the latter acting to revolve the numeral disks under certain predetermined conditions.

The invention is fully described in the following specification, wherein reference is made to the accompanying drawing, wherein—

Figure 1:
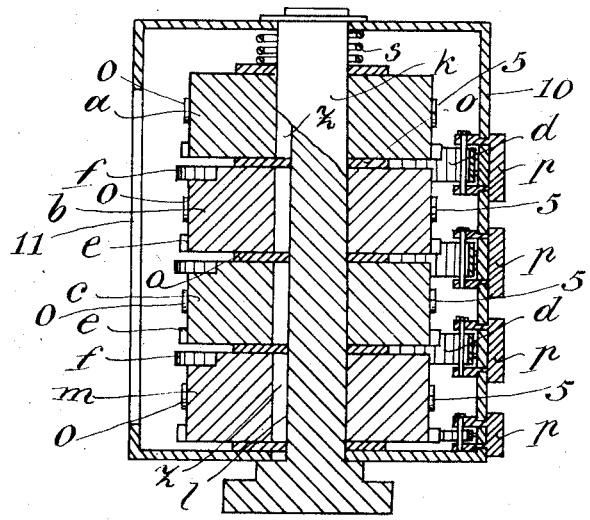
Figure 2:
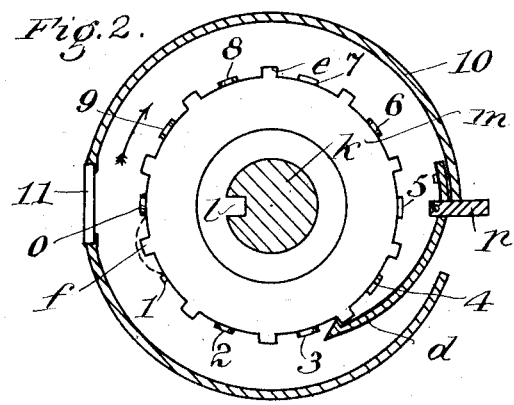
Figure 3:
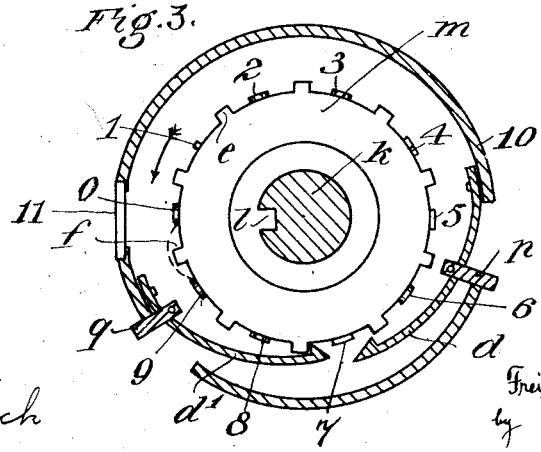

Figure 1 is a vertical central section of an apparatus embodying the invention; Fig. 2 is a horizontal sectional view thereof; and Fig. 3 is a similar view of an apparatus which may be used for both addition and subtraction.

Referring to the drawing by reference characters, 10 designates a suitably formed casing provided with an opening 11 therein through which the operation of the machine is visible. Passing longitudinally through approximately the central part of the casing 10 is a shaft $k$ having loosely mounted thereon numeral disks $a$, $b$, $c$, and $m$, of which the disk $m$ is preferably the unit disk. Lying against each lateral face of the numeral disks is a friction member or disk $o$, having a tongue or projection $z$ entering a slot $l$ in the shaft $k$, whereby the friction disks are constrained to revolve with the shaft $k$. The several numeral disks and friction disks are movable longitudinally of the shaft $k$. Suitable means such as a spring $s$ arranged at one end of the shaft $k$ is provided for exerting relatively light pressure and pressing all the disks together. When the shaft $k$ is revolved, those numeral disks which are not held against rotation, are caused to revolve by reason of frictional contact between such numeral disks and certain of the friction disks.

As shown in Fig. 2, spring pawls $d$ are provided which are adapted to engage teeth $e$ formed on the numeral disks so that normally the numeral disks are prevented from rotating when the shaft $k$ is revolved. Each pawl $d$ is provided with a key $p$ which is slidable on the pawl and by means of which the pawl may be moved out of engagement with the teeth on the numeral disks. When one or more of these pawls are moved out of engagement with the teeth on one or more of the numeral disks, the latter are free to revolve with the shaft $k$ in the direction of the arrow shown in Fig. 2. The normal tendency of the spring pawls $d$ is to extend into engagement with the teeth $e$. When a key $p$ is nearest that part of the pawl which is secured to the casing, the normal tendency of the pawl to extend toward the teeth $e$ is not restricted. The keys $p$ move in the same arc as that of the circular casing 10, so that when a key $p$ is moved toward the free end of a pawl $d$ such free end will be drawn away from the teeth $e$ in the direction of the casing 10.

Upon reference to Fig. 1, it will be noted that the pawls $d$ which are designed to engage the teeth on the numeral disks, $a$, $b$ and $c$, are sufficiently broad to overlap two adjacent disks. Each of the disks $a$, $b$ and $c$ is provided with a cam surface $f$ which is so arranged that when the numeral disk carrying the cam passes from 9 to 0 at the opening 11, said cam will act on one of the pawls $d$, thus releasing it from engagement with the teeth of the numeral disk next in order of progression, whereby the latter disk will be free to participate in the revolution of the shaft $k$.

By this arrangement, I provide means for automatically producing the successive movement of the units, tens, hundreds etc. disks at the proper relative times. Each pawl tooth is beveled or rounded off so that when the shaft revolves in a direction opposite that indicated by the arrow in Fig. 2, the teeth *e* of the numeral disks can glide past the pawls, and the disks are thus free to revolve.

It is to be understood that I am not limited to the precise number of numeral disks shown in the drawing, as any desired number may be used, and the disks illustrated in Figs. 1 and 2 present a very simple and accurately operating form of adding machine.

Referring to Fig. 3, it will be noted that this form of the device may be used for both addition and subtraction, in that the numeral disks are susceptible of reverse rotation. There is provided for each numeral disk two pawls *d* and *d'* respectively, the pawl *d* being movable out of engagement with the teeth by means of the key *p*, whereby the pawl *d'* becomes operative which in turn may be moved out of engagement with the teeth *e* by means of the key *q*.

The explanation heretofore given in respect to the revolution of the numeral disks in the direction of the arrow in Fig. 2 applies for the reverse direction, that is, in the direction shown by the arrow in Fig. 3. In this figure the numerals on the numeral disks are placed thereon in the reverse direction and the cam surfaces *f* release the pawls *d'* when the corresponding numeral disk passes from zero to 9, in the opening 11.

In adding or subtracting with a machine of the character described, the shaft *k* is given as many times one tenth a revolution as is required by the amount to be added or subtracted. Revolution of the shaft *k* may be produced manually or by any mechanical means appropriate for the purpose.

If desired, the unit numeral disk may be made rigid with the shaft and in this form of the invention there would be but one pawl for each numeral disk, and the keys *p* and *q* would be omitted.

In the drawings the numerals on the peripheries of the disks have been shown and are indicated by reference characters from 9 to 0 in Fig. 2 and from 0 to 9 in Fig. 3. In Fig. 1 it has been assumed that the zero numeral appears at the left hand side of that figure, while the numeral 5 appears at the right hand side on all the disks.

A construction of this kind is very simple and may be used as a cyclometer presenting a very material advantage over other cyclometers, in that it may be very readily turned to the zero position.

Having thus described my invention, what I claim as new and desire to secure by Letters Patent is:—

1. In a device of the character specified, the combination with a casing and a shaft revoluble therein, of a plurality of numeral disks superposed on and revoluble about said shaft, friction disks in operative contact with said numeral disks and being constrained to revolve with the shaft, means adapted to yieldingly engage said numeral disks and normally retain them against revolution, and means provided on the periphery of said numeral disks for releasing said engagement means and permitting certain predetermined numeral disks to revolve.

2. In a device of the character specified, the combination with a casing, of a shaft revolubly mounted therein, a plurality of numeral disks loosely mounted for revolution about said shaft, a plurality of friction disks in operative contact with said numeral disks and being constrained to revolve with said shaft, teeth provided on the periphery of said numeral disks, means on the casing designed to yieldingly engage said teeth and normally retain the numeral disks against rotation, and means provided on the periphery of said numeral disks for releasing said engagement means whereby certain predetermined numeral disks are free to rotate with the friction disks.

3. In a device of the character specified, the combination with a casing, of a shaft revoluble therein, said shaft being provided with a longitudinal slot, a plurality of superposed numeral disks mounted for revolution about said shaft, friction disks in operative contact with said numeral disks, each of said friction disks having a tongue projecting into the slot in the shaft whereby said friction disks are constrained to revolve with the shaft, a plurality of pawls carried by the casing and adapted to project into engagement with said numeral disks, certain of said pawls being adapted to overlap two adjacent numeral disks, and means carried by said numeral disks whereby certain of said pawls are moved out of engagement with predetermined numeral disks to permit the latter to revolve with the friction disks.

4. In a device of the character specified, the combination with a casing, of a shaft revolubly mounted therein, a plurality of numeral disks mounted for revolution about said shaft, each of said numeral disks having a series of teeth at one edge of its periphery and a cam surface at the opposite edge of its periphery, friction disks revoluble with said shaft and in operative contact with said numeral disks, and means adapted to yieldingly engage the teeth of said numeral disks and to be disengaged from said teeth by the cams on said numeral disks.

5. In a device of the character specified, the combination with a casing, of a shaft revolubly mounted therein, a plurality of numeral disks loosely mounted for revolution about said shaft, friction disks in operative contact with said numeral disks and adapted to revolve with said shaft, a series of teeth formed about one edge of the periphery of each of said numeral disks, a cam mounted on the opposite edge of the periphery of each numeral disk, spring pawls carried by the casing and designed to extend into engagement with the teeth on said numeral disks, certain of said spring pawls being designed to overlap adjacent numeral disks whereby said pawls are in the path of the teeth on one numeral disk and the cam of an adjacent numeral disk, and means whereby said pawls may be manually moved into and out of engagement with said numeral disks.

6. In a device of the character specified, the combination with a casing, of a shaft revolubly mounted therein, a plurality of numeral disks mounted for revolution about said shaft, a plurality of friction disks in operative contact with said numeral disks and designed to revolve with said shaft, teeth formed about the periphery of each numeral disk, a pair of spring pawls for each said numeral disk adapted to engage the teeth on said disks, and means whereby said spring pawls may be moved into and out of engagement with said teeth.

7. In a device of the character specified, the combination with a casing, of a shaft revoluble therein, a plurality of numeral disks mounted for revolution about said shaft, a plurality of friction disks revoluble with said shaft and in operative contact with said numeral disks, a spring pawl designed to engage said numeral disks and a key slidably mounted on said spring pawl whereby the latter may be moved into and out of engagement with the teeth on said numeral disks.

In testimony whereof I hereunto affix my signature in the presence of two witnesses.

FREIHERR MAX von BECHTOLSHEIM.

Witnesses:
FROOND AGELZU AICHBERG,
FRIEDRICH VON KOBELL.